Nov. 22, 1955 W. ALBERT 2,724,311
STEREOSCOPIC ATTACHMENT FOR PHOTOGRAPHIC CAMERAS
Filed April 15, 1952 2 Sheets-Sheet 1
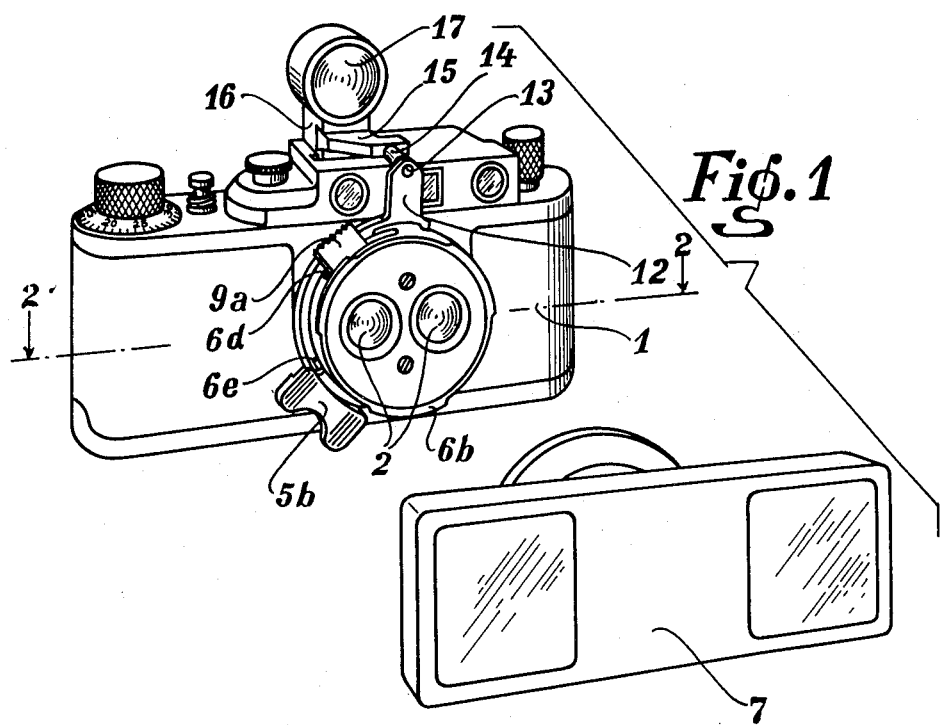
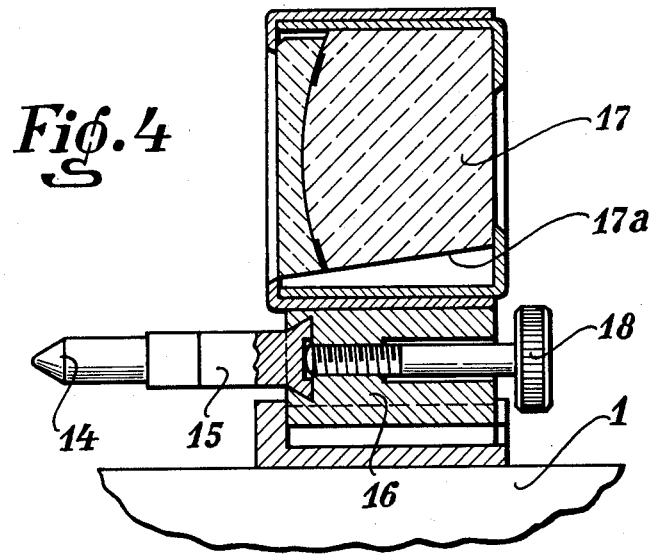
INVENTOR.
Wilhelm Albert
BY
Joan E. A. Königsberg Nov. 22, 1955  W. ALBERT  2,724,311
STEREOSCOPIC ATTACHMENT FOR PHOTOGRAPHIC CAMERAS
Filed April 15, 1952  2 Sheets-Sheet 2
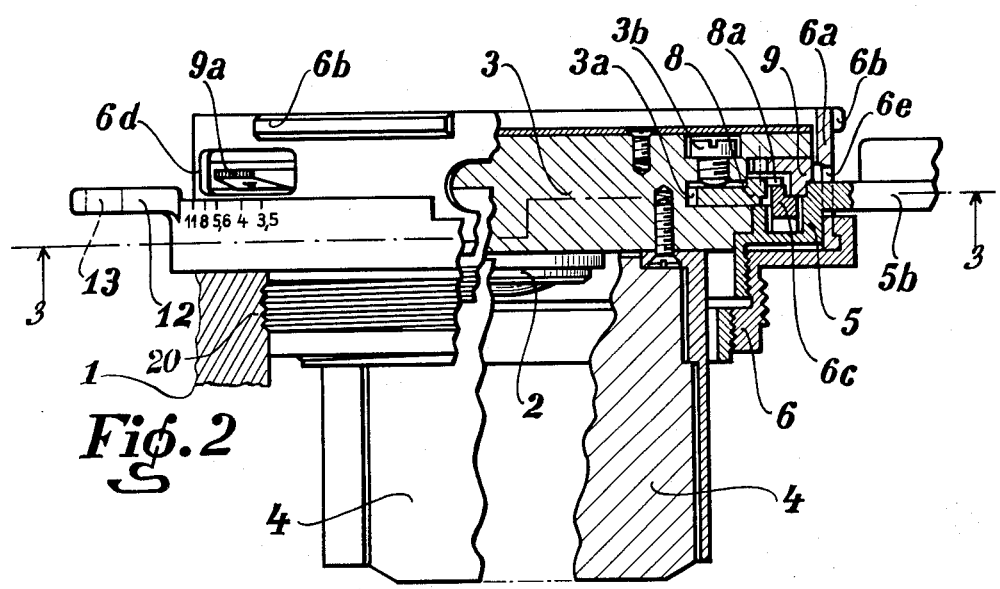
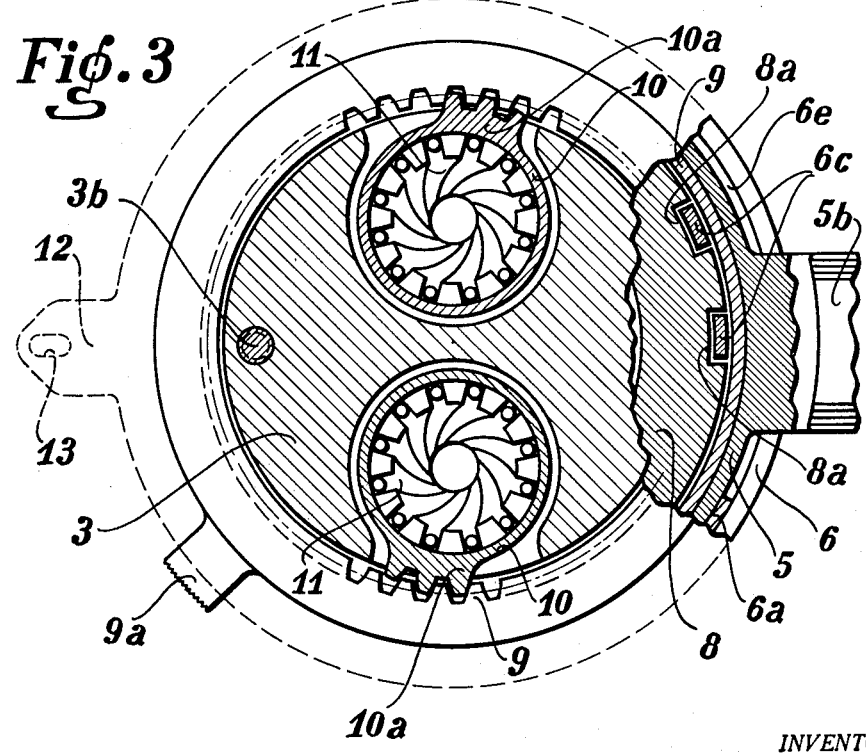
INVENTOR.
Wilhelm Albert
BY
Ivan E. A. Konigsberg
Atty.

2,724,311
Patented Nov. 22, 1955

2,724,311

STEREOSCOPIC ATTACHMENT FOR PHOTOGRAPHIC CAMERAS

Wilhelm Albert, Wetzlar (Lahn), Germany, assignor to Ernst Leitz, G. m. b. H., a corporation of Germany Application April 15, 1952, Serial No. 282,450

Claims priority, application Germany June 18, 1951

3 Claims. (Cl. 95—18)

This invention relates to a stereoscopic attachment for photographic cameras characterized by that the double objective is adjustably supported in a single detachable supporting objective carrier.

It has been found, that the mechanical parts which serve to connect the double objective with the camera are subject to wear which causes an angular dislocation of the double axes with respect to the horizontal plane, such wear resulting from the frequent detachment from and subsequent attachment to the camera. For example, when it is desired to alternate stereoscopic exposure with single exposure, the connecting elements are subject to much wear. The dislocation of the double axes causes the pictures on the film to be displaced and this trouble is aggravated when enlarging prisms are mounted in front of the double objective because the weight of such prisms alone is in itself sufficient to cause such dislocation.

The object of the invention is to provide a stereoscopic double objective attachment for cameras so arranged that the carrier which supports the double objective is adjustable with relation to its supporting frame and thereafter permanently secured in adjusted position whereby to insure that the double axes are correctly positioned. The invention also provides an adjustable positioning bolt on the view finder of the camera which engages a guiding slot on the double objective to insure correct position of the latter in spite of frequent removals from the camera. Repeated adjustments of the double objective are thereby avoided.

A further object of this invention is to mount the adjustable positioning bolt upon the detachable and adjustable view finder of the camera. This, in turn, insures that all the additional parts which are necessary only for stereoscopic exposures may be removed when not wanted or when only single exposures are to be made.

Another object of the invention is to provide that the double objective carrier is axially movable with relation to a coupling member which connects the double objective with the camera. Also, that the means for supporting the base enlarging prisms are arranged on the coupling member and not on the double objective carrier so that the latter is not burdened with the weight of the prisms. This also is a means to avoid dislocation of the double axes. The shutter setting means and the focus adjusting means are mounted in the double objective carrier and are operable from outside the coupling member. In the accompanying drawings illustrating the invention Fig. 1 is a perspective view of a camera with attached stereoscopic double objective supported in a single carrier and also illustrates the view finder arrangement and shows the separated base enlarging prisms.

Fig. 2 is a view taken substantially on the line 2—2 in Fig. 1 with parts in section and parts broken away.

Fig. 3 is a sectional view taken substantially along the bent line 3—3 in Fig. 2.

Fig. 4 is a vertical sectional view of the view finder and bolt attachment on top of the camera looking from the right in Fig. 1. No section line is drawn in Fig. 1 for the sake of clearness in that figure.

Referring first to Fig. 1, the numeral 1 designates a curtain shutter camera of a known type having all the usual camera mechanisms for taking pictures. A threaded portion 20, see Fig. 2, is adapted to be engaged by the coupling ring 6 of the double objective attachment whereby to attach the latter to the camera.

The double objective 2, Figs. 2 and 3, is supported in an objective carrier 3 provided with the usual septum 4. The carrier 3 is supported in a focusing ring 5 which is in threaded engagement with the coupling ring 6, as shown, so that the double objective 2 may be focused by moving the focusing ring 5 axially within the coupling ring 6. The coupling ring 6 carries an annular sleeve 6a which surrounds the carrier 3 and is formed with projecting ears 6b for attaching the base enlarging prisms 7. The ears 6b are shown in Figs. 1 and 2.

The objective carrier 3 has an annular groove 3a which contains an objective clamping ring 8. The latter has axially disposed slots 8a which are engaged by guiding teeth 6c on the coupling ring 6. The objective carrier 3 is clamped to the clamping ring 8 by clamping screws 3b.

The arrangement is such, that the ring 8 with the carrier 3 and the objectives 2 do not rotate when the focusing ring 5 is screwed in or out in the coupling ring 6, but are only axially movable therein, the slots 8a in the ring 8 sliding axially upon the guiding teeth 6c. The adjustment of the axes of the double objective 2 in the carrier 3 with respect to the axially movable clamping ring 8 may be effected after the clamping screws 3b have been loosened.

The double objective has two diaphragms 11, 11 which are adjusted in the usual manner by rings 10. Each ring has a toothed portion 10a engaged by the teeth on a gear 9. The latter has a handle 9a which projects outward through an opening 6d in the sleeve 6a. Both diaphragms may therefore be equally adjusted by rotating the gear 9.

The focusing ring 5 has a handle 5b which projects outward through an opening 6e in the sleeve 6a. By grasping the handle the ring is rotated for focusing purposes.

As referred to in the foregoing, this invention includes a positioning bolt in engagement with a guiding slot so arranged on the camera and on the stereoscopic attachment, respectively, that when the dislocation of the double objective axes has been once corrected, repeated removals from and attachment upon the camera of the attachment may be made with the assurance that the double axes are permanently correctly positioned.

Referring now to Figs. 1 and 4, the view finder 17 on top of the camera is as usual axially movable thereon in the usual finder shoe on the camera. The finder base 16 has a slot in which a holder 15 is slidably supported. The holder 15 carries the bolt 14. The latter is adapted to engage a slot 13 in a lug 12, Fig. 2, which is formed on the coupling ring 6. When the stereoscopic attachment is screwed onto the camera, the slot 13 comes within the range of the bolt 14.

The operation is as follows: The stereoscopic attachment is screwed onto the camera and secured in position by moving the bolt axially forward to enter the slot 13. Then the clamping screws 3b are loosened and the objective carrier 3 rotated within the coupling ring 6 to bring the objective axes into the correct horizontal positions with respect to the optical axis of the camera after which the screws 3b are tightened to clamp the carrier 3 to the clamping ring 8 and focusing ring 5, respectively. When the double objective has been thus clamped in the correct position by the clamping screws 3b, the bolt 14 is secured in position in engagement with slot 13 by means of the screw bolts 18, Fig. 4. The stereoscopic attachment may thereafter be unscrewed from the camera by merely withdrawing the bolt 14 from the slot 13 which is done by sliding the view finder backwards in a known manner. The attachment is mounted upon the camera by screwing it on until the bolt is again able to engage the slot.

In securing the attachment to the camera, the assembled position will depend upon the force applied by the user and upon the wear upon the screw threads whereby the horizontal plane of the double objectives may become dislocated. The adjusted correct position is, however, mechanically secured by the engagement of the bolt 14 with the slot 13 as described. The attachment may be repeatedly dismounted and put back upon the camera and the objective axes will remain in the correct adjusted position.

It is another advantage of the disclosed invention that tolerances in manufacturing, for example in the screw threads, may be compensated for so that the double stereoscopic device may be easily adjusted to fit any camera casing.

The inclined mirrored surface shown in Fig. 4 and numbered 17a serves to indicate to the user of the camera whether the camera and the stereoscopic attachment are in the correct horizontal positions.

I claim:

1. In combination, a photographic camera, a stereoscopic attachment for said camera comprising a double objective, a carrier supporting the same, a clamping ring engaging said carrier in non-rotatable relation, means for adjustably securing said objective carrier and double objective to said clamping ring in relation to the horizontal plane, a coupling ring for removably securing the attachment to the camera, a focusing ring within and in threaded engagement with said coupling ring and engaging said carrier to focus said double objective subsequent to the adjustment thereof as aforesaid, a focusing ring operating handle projecting to the outside of said coupling ring, a guiding slot formed on said coupling ring and an adjustable positioning bolt on said camera engaging said guiding slot to align the optical axes of the double objective with the optical axis of said camera and means for adjusting said bolt and clamp it in its adjusted position.

2. The combination according to claim 1 including a view finder on said camera, means on said camera view finder for supporting said adjustable positioning bolt thereon for engagement with the said guiding slot, means for adjusting said bolt parallel to the optical axes of the camera and said attachment and means for clamping said bolt in said adjusted position on said view finder.

3. The combination according to claim 1 including two diaphragms for said double objective supported in said objective carrier, gear means on said shutters for adjusting the same, a gear rotatably supported within said coupling ring and engaging said gear means for simultaneously adjusting said diaphragms to the same extent and a gear operating handle on said gear extending through said coupling ring to the outside thereof.

References Cited in the file of this patent

UNITED STATES PATENTS

| | | |
|---|---|---|
| 1,922,963 | Lane | Aug. 15, 1933 |
| 1,984,953 | Thomas | Dec. 18, 1934 |